Nov. 21, 1939.   F. H. LE JEUNE   2,181,020
APPARATUS FOR MANUFACTURING VEHICLE WHEEL RIMS
Filed June 22, 1936   2 Sheets-Sheet 1
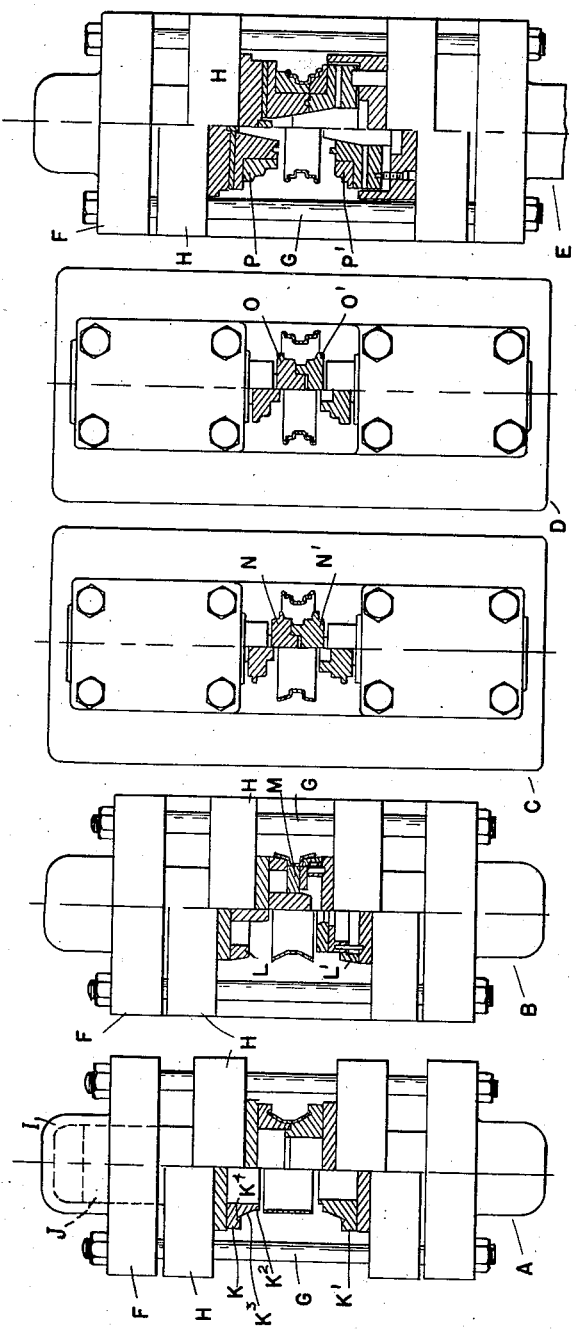
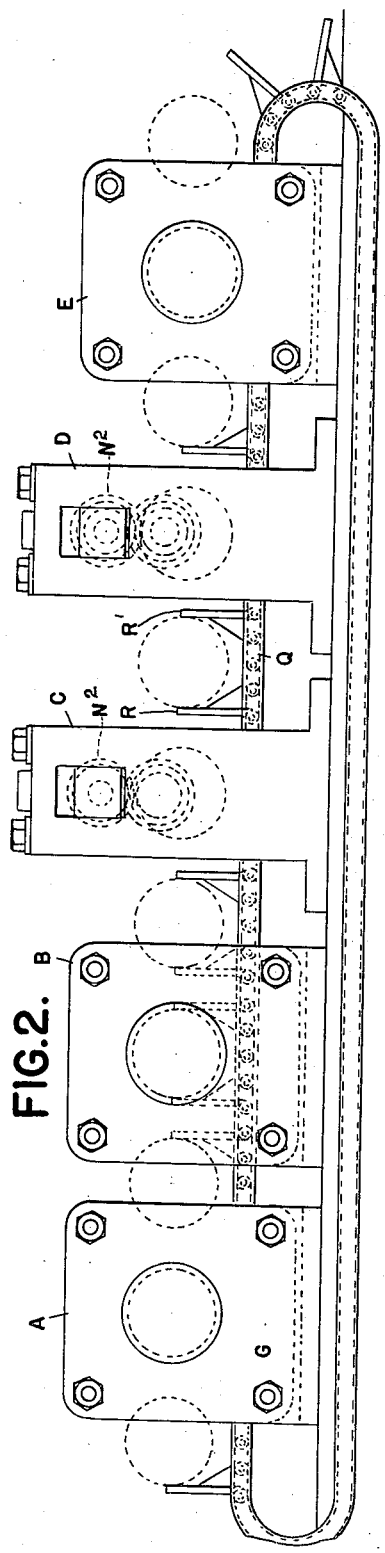
INVENTOR
FRANK H. LeJEUNE
BY *Whittemore Hulbert & Belknap*
ATTORNEYS Nov. 21, 1939.　　　F. H. LE JEUNE　　　2,181,020
APPARATUS FOR MANUFACTURING VEHICLE WHEEL RIMS
Filed June 22, 1936　　　2 Sheets-Sheet 2
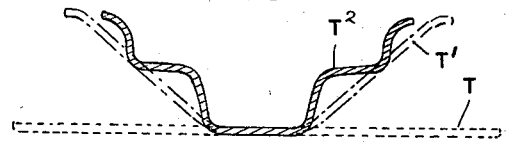
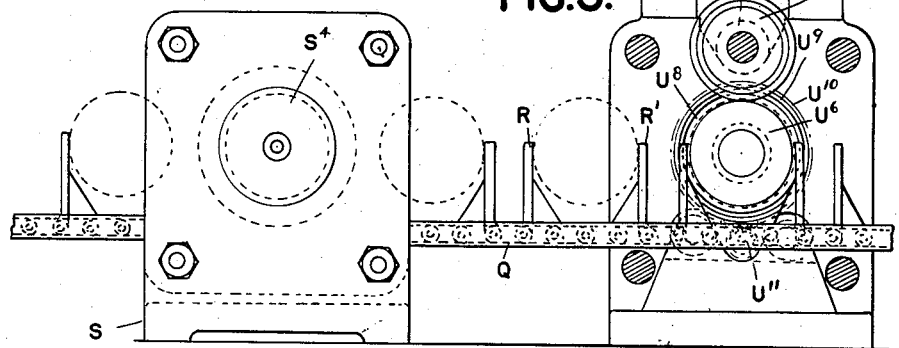
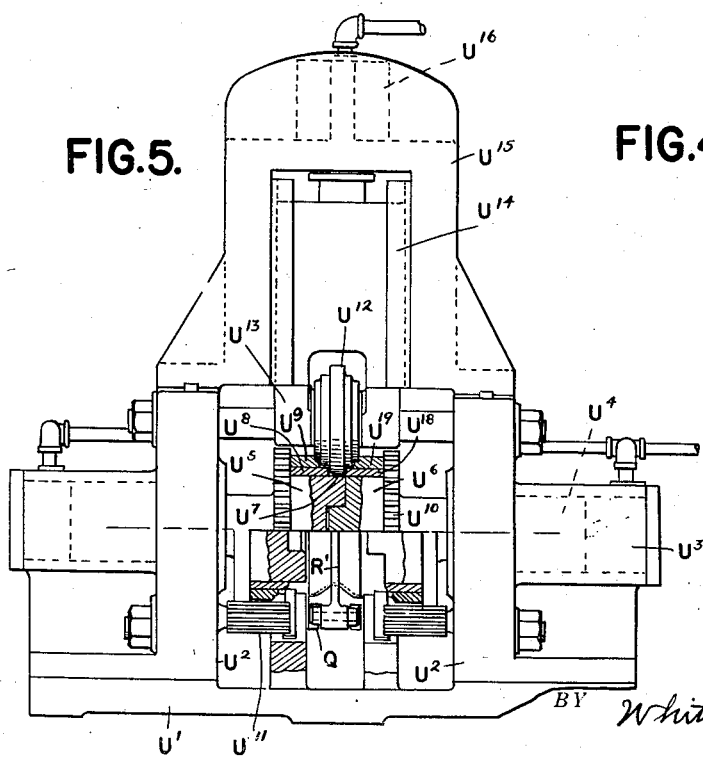
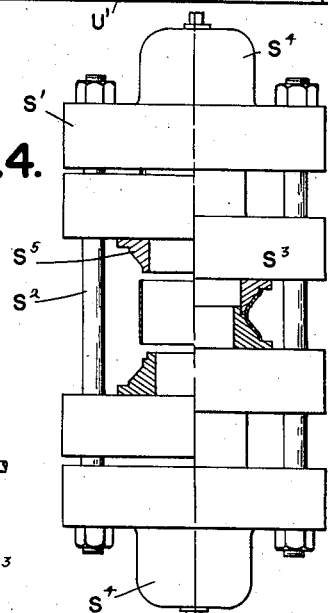
INVENTOR
FRANK H. LeJEUNE
BY Whittemore Hulbert Belknap
ATTORNEYS

Patented Nov. 21, 1939

2,181,020

UNITED STATES PATENT OFFICE 2,181,020

APPARATUS FOR MANUFACTURING VEHICLE WHEEL RIMS

Frank H. Le Jeune, Detroit, Mich., assignor to Kelsey-Hayes Wheel Company, Detroit, Mich., a corporation of Delaware Application June 22, 1936, Serial No. 86,671

2 Claims. (Cl. 153—2)

The invention relates to the manufacture of vehicle wheel rims and more particularly to that type known as "drop-center" rims in which there is a radially inwardly extending well between the seats for the beads of the tire. It is the object of the invention to expedite the manufacture, avoiding the necessity of rehandling the rims between successive steps in the operation, and also avoiding the requirement for storage space for the rims after each step. It is a further object to avoid any operation requiring a period of time greatly in excess of that for the other operations. Still further, it is an object to perform all of the operations simultaneously but upon successive lengths so that one rim is completed for each operation. With these and other objects in view, the invention consists in the construction as hereinafter set forth.

In the drawings:

Figure 1 is a plan view of the apparatus partly in section showing the successive mechanisms and with the elements in the portion to the left of the center line of each mechanism shown in initial position and those to the right of said center line in final position;

Figure 2 is a side elevation thereof;

Figure 3 is a view similar to Figure 2 showing a modified construction;

Figure 4 is a plan view partly in elevation of the first mechanism shown in Figure 3 with the elements to the left of the center line in initial position and those to the right of said center line in final position;

Figure 5 is a transverse section partly in elevation of the second mechanism shown in Figure 3;

Figure 6 is a cross-section through the rim showing the successive steps of forming the same from the cylindrical hoop.

The improved apparatus is designed to form the rims by a method in which a cylindrical hoop of a diameter substantially the same as the base of the drop-center of the rim is successively expanded and fashioned to form the sides of the well or drop-center, the bead seats and the tire retaining flanges. The successive steps in this expanding and refashioning are performed at different station points, the work being intermittently and automatically advanced from station to station, so as to avoid any necessity for manual operations. As shown, a series of mechanisms A, B, C, D and E are located at successive station points in alignment with each other. Each of these mechanisms includes means engageable with the work from opposite sides of a common central plane, said means operating intermittently and simultaneously in the successive mechanisms. There is also an intermittently operating conveyor for advancing the work from mechanism to mechanism and for maintaining engagement therewith until the completion of the process, whereupon the finished rim is discharged therefrom.

As shown, the mechanisms A, B and E are each provided with a frame including stationary spaced heads F connected by rods G at the four corners thereof. Slidably mounted on these rods G are movable heads H which are periodically actuated by suitable means, such as fluid motors I mounted on the heads F and pistons J connecting with the heads H. The operation of these motors is controlled by any suitable timing mechanism, not shown, it being understood that all motors for the several mechanisms operate simultaneously. In mechanism A annular dies K and K' are mounted on the opposed heads H and in axial alignment with each other. These dies are so fashioned as to have a cylindrical portion $K^2$ of a diameter to enter within a cylindrical hoop substantially of the size of the base of the rim, also, a flaring portion $K^3$ extending outward from said cylindrical portion and a limiting shoulder $K^4$ at the outer end of said flaring portion. The mechanism B is also provided with cooperating annular dies L and L' but these are fashioned to engage the flared portion of the hoop formed by mechanism A bearing thereon at a point intermediate the ends of the flare and refashioning it to form the sides of the drop-center or well of the rim. There is further provided in mechanism B an expanding chuck M which is axially floatingly secured to one of the heads H so as to be inserted within the central portion of the hoop. This chuck is actuated at the proper time to expand and circularize the hoop prior to the engagement of the dies L and L' therewith holding it in this position during the operation of said dies and thereby avoiding any radially inward movement or contraction of said central portion. Mechanisms C and D differ from mechanisms A and B in that each is provided with cooperating male and female rolls adapted to engage the rim as formed by the mechanism B and to further fashion it so as to form the bead seats for the tire and a portion of the retaining flanges. The female roll is formed of separate sections N and N' which are first separated for the passage of the work between the same and are then moved together within the hoop and in cooperation with the male roll $N^2$ perform the refashioning operation. The male roll is pressed toward the female roll by any suitable mechanism, such as shown in Figure 5 and as hereinafter described. Mechanism D is similar to mechanism C with the exception that the rollers O and O' are shaped to perform a further fashioning and particularly in forming the outer curved portions of the rim flanges. Mechanism E is similar in construction to mechanisms A and B, but the annular dies P and P' which engage the work from opposite sides thereof are fashioned to perform an expanding operation giving the final shape and size to the rim.

The work is advanced from mechanism to mechanism by a conveyor Q shown as an endless chain provided with holders for engaging the hoops. These holders as shown consist of pairs of arms R and R' adapted to engage the outer face of the hoop at diametrically opposite points and in the central plane of the mechanisms A, B, etc. Inasmuch as none of the operations performed by the mechanisms A, B, etc., bring any member in contact with the outer face of the work at the center of the rim, there is nothing to interfere with the holders R and R' remaining in contact with the work during the performance of these operations. The movement of the carrier is timed so as to advance the work during the interval in which the cooperating members in the several mechanisms are moved apart, leaving a clear path therebetween. Also, the carrier is adjusted to accurately align the work held by successive holders with the mechanisms with which they register.

With the construction as described, when the apparatus is in operation cylindrical hoops are successively placed in engagement with the holders at the left of mechanism A. During intervals of advancement each hoop is successively registered with mechanisms A, B, C, D and E, and is finally discharged at the right of mechanism E as a fully formed rim.

In the modified construction shown in Figures 3 to 6 inclusive, the apparatus is simplified and the number of distinct operations reduced. With this construction the first mechanism S is similar in construction to the mechanism A shown in Figure 1 comprising stationary heads S' connected by rods $S^2$ and movable heads $S^3$ actuated by fluid motors $S^4$ and carrying the forming dies $S^5$ which latter are similar to the dies K and K' shown in Figure 1. Thus, the cylindrical hoop when subjected to the operation of this mechanism is changed from the form shown at T, Figure 6, to the form T' in the same figure. The conveyor Q and arms R, R' are the same as in Figure 2 so that the cylindrical hoop is first registered with the mechanism S and then transferred to registration with a mechanism U. The latter comprises a base U' on which is mounted a pair of stationary spaced heads $U^2$ each provided with a fluid cylinder $U^3$ containing a piston $U^4$. On these pistons are mounted complementary die members $U^5$ and $U^6$ which together form a female die exactly of the contour and dimensions of the finished hoop. In cross-section the die member $U^5$ has a cylindrical portion $U^7$ corresponding to the bottom of the well or drop-center portion of the rim. Surrounding this is an annular die member $U^8$ fashioned to form the sides of the well and the bead seats and surrounding this an annular member $U^9$ fashioned to form the flanges of the rim. The die member $U^6$ is also provided with similar annular portions $U^{18}$ and $U^{19}$ for forming the opposite side of the rim. The die members $U^5$ and $U^6$ are further provided with gear portions $U^{10}$ which are in engagement with pinions $U^{11}$ mounted on a shaft which is driven by any suitable source of power, not shown. There is also a forming roll $U^{12}$ which is of a cross-section corresponding to the inner cross-sectional contour of the finished rim. This forming roll is revolubly mounted on a head $U^{13}$ which is vertically slidable in ways $U^{14}$ on an upward extension $U^{15}$ of the frame and a fluid motor $U^{16}$ is adapted to move this head $U^{14}$ downward pressing the forming roll $U^{12}$ against the rim which is engaged by the complementary dies $U^5$. The construction and arrangement of the parts is such that the hoop having the flared ends as indicated at T' formed by the mechanism S and then transferred into registration with the mechanism U, is subjected to a further forming operation. This comprises the simultaneous movement of the die members $U^5$ and $U^6$ towards each other under the impelling pressure of the fluid cylinders $U^3$ and the simultaneous rotation of these die members by the gear wheels $U^{10}$ and pinions $U^{11}$. At the same time the roller $U^{12}$ is pressed radially against the rim by the fluid cylinder $U^{16}$ so as to produce a rolling action around the revolving hoop. The annular members $U^8$ and $U^9$ as they are moved inward, form the sides of the well, the bead seats and the flanges of the rim, and due to the rolling action of the roller $U^{12}$ in cooperation with said dies, there is a gradual change in contour from that shown at T' to that shown at $T^2$, Figure 6. Also, the rolling action will give a permanent form to the rim avoiding subsequent springing out of shape as might be the case if the forming were done solely by non-revolving dies. Thus the operation of the mechanism U simultaneously performs the operations which are separately performed by the mechanisms B, C, D and E, as shown in Figure 1. Upon the completion of the forming operation the die members $U^5$ are separated permitting the finished rim to be carried away by the conveyor Q and arms R and R'.

What I claim as my invention is:

1. In an apparatus for forming wheel rims, the combination with means for successively advancing the hoops in a vertical plane from station to station of a series of stations, said means including holders for externally engaging the hoops on diametrically opposite sides and centrally between opposite ends thereof of mechanisms located at the successive stations for engaging the work from opposite sides thereof, there being one or more pairs of cooperating dies and fluid actuated means for expanding the opposite end portions of a cylindrical hoop, one or more pairs of cooperating rolls for further fashioning the expanded hoop, and a final mechanism including cooperating dies for expanding the work to its final form.

2. In a machine for forming wheel rims, means for intermittently advancing a series of hoops in a vertical plane transverse to the axes thereof, said means including holders for externally engaging the hoops on diametrically opposite sides and centrally between opposite ends thereof, a series of mechanisms for axially registering with the successive hoops during the interval of rest, each mechanism including forming members arranged on opposite sides of said plane so as to clear said hoops during advancement, fluid actuated means for operating the same, the forming members of one or more of said mechanisms being dies for internally engaging the opposite end portions of the registering hoop to expand the same, and the forming members of one or more succeeding mechanisms including complementary portions of a forming roll for oppositely entering the expanded portions of said hoop and further including a cooperating external roll located to clear said holders during advancement thereof.

FRANK H. LE JEUNE.